United States Patent [19]

Zwart

[11] Patent Number: 5,143,138
[45] Date of Patent: Sep. 1, 1992

[54] SCREEN MOLDING

[76] Inventor: Jerry J. Zwart, 44 Parry Rd., Stamford, Conn. 06907

[21] Appl. No.: 762,441

[22] Filed: Sep. 19, 1991

[51] Int. Cl.⁵ .......................................... A47H 13/00
[52] U.S. Cl. ..................................... 160/395; 160/369; 160/380
[58] Field of Search ............... 160/395, 371, 369, 380, 160/398, 404, 391, 392

[56] References Cited

U.S. PATENT DOCUMENTS

| | | | |
|---|---|---|---|
| 956,240 | 4/1910 | Watson | 160/395 |
| 2,245,961 | 6/1941 | Clay | 160/395 |
| 3,143,165 | 8/1964 | Lewis et al. | 160/380 X |
| 3,895,468 | 7/1975 | Bernstein | 160/395 X |
| 4,153,981 | 5/1979 | Stuppy | 160/395 X |
| 4,189,880 | 2/1980 | Ballin | 160/380 X |
| 4,233,790 | 11/1980 | Meadows | 160/395 X |
| 4,337,815 | 7/1982 | Lindstrom | 160/395 X |
| 4,662,038 | 5/1987 | Walker | 160/395 X |
| 4,899,797 | 2/1990 | Green | 160/380 X |

Primary Examiner—David M. Purol
Attorney, Agent, or Firm—Leon Gilden

[57] ABSTRACT

Molding, which is attached directly to the outside of a house around a window, includes a continuous groove for receiving the edges of a sheet of flexible screening. A strip of flexible tubular rubber is used to force the screen into the groove and operates to frictionally retain the screen in engagement with the molding, and a decorative cap can then be snap fitted into the groove to further hold the screen in place. A flexible retaining strip may be removably attached to the decorative cap and can include a plurality of barbed tacks which engage the tubular rubber holding ring. The barbed tacks operate to remove the tubular rubber member when the decorative cap is pulled away from the molding so as to facilitate an easy removal of the screen for purposes of replacement or repair.

1 Claim, 4 Drawing Sheets

SCREEN MOLDING

BACKGROUND OF THE INVENTION

1. Field of the Invention

The present invention relates to window screens and more particularly pertains to a molding which can be provided with a permanent screen holding groove structure.

2. Description of the Prior Art

The use of screens to cover windows on buildings is known in the prior art. Typically, these screens are mounted within their own frame structure and must be manufactured to the correct size prior to attachment to a window. Further, special mounting procedures are required to attach the screens which complicates the process of repairing or replacing a screen whenever desired. Therefore, it can be appreciated that there is a need for simple and more economical methods of repairing or replacing screens over windows and in this regard, the present invention substantially fulfills this need.

SUMMARY OF THE INVENTION

In view of the foregoing disadvantages inherent in the known types of window covering screens now present in the prior art, the present invention provides an improved screen covering construction wherein a screen can be quickly sized and attached to existing window molding without the need of special fasteners or screen holding frames. As such, the general purpose of the present invention, which will be described subsequently in greater detail, is to provide a new and improved window covering screen which has all the advantages of the prior art window covering screens and none of the disadvantages.

To attain this, the present invention essentially comprises molding which is attached directly to the outside of a house around a window and which includes a continuous groove for receiving the edges of a sheet of flexible screening. A strip of flexible tubular rubber is used to force the screen into the groove and operates to frictionally retain the screen in engagement with the molding, and a decorative cap can then be snap fitted into the groove to further hold the screen in place. A flexible retaining strip may be removably attached to the decorative cap and can include a plurality of barbed tacks which engage the tubular rubber holding ring. The barbed tacks operate to remove the tubular rubber member when the decorative cap is pulled away from the molding so as to facilitate an easy removal of the screen for purposes of replacement or repair.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved screen retaining molding which has all the advantages of the prior art screen retaining moldings and none of the disadvantages.

It is another object of the present invention to provide a new and improved screen retaining molding which may be easily and efficiently manufactured and marketed.

It is a further object of the present invention to provide a new and improved improved screen retaining molding which is of a durable and reliable construction.

An even further object of the present invention is to provide a new and improved screen retaining molding which is susceptible of a low cost of manufacture with regard to both materials and labor, and which accordingly is then susceptible of low prices of sale to the consuming public, thereby making such improved screen retaining moldings economically available to the buying public.

Still yet another object of the present invention is to provide a new and improved screen retaining molding which provides in the apparatuses and methods of the prior art some of the advantages thereof, while simultaneously overcoming some of the disadvantages normally associated therewith.

Still another object of the present invention is to provide a new and improved screen retaining molding which facilitates the removal and replacement of screening over a window opening without the necessity of manufacturing a screen holding frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
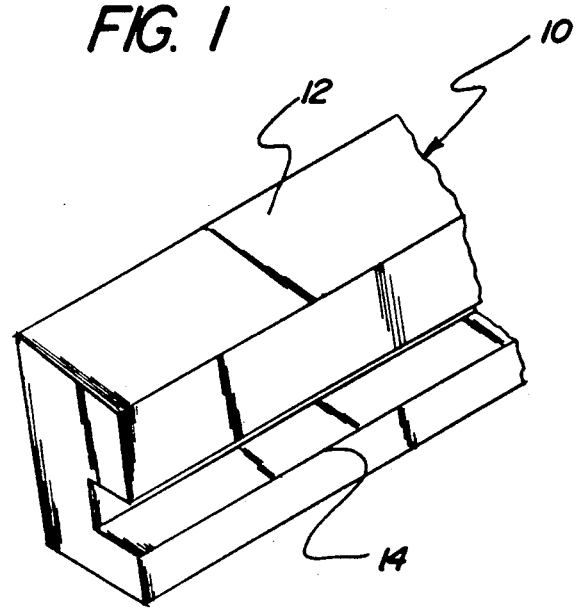
FIG. 1 is a partial perspective view of the screen retaining molding comprising the present invention.
Figure 2:
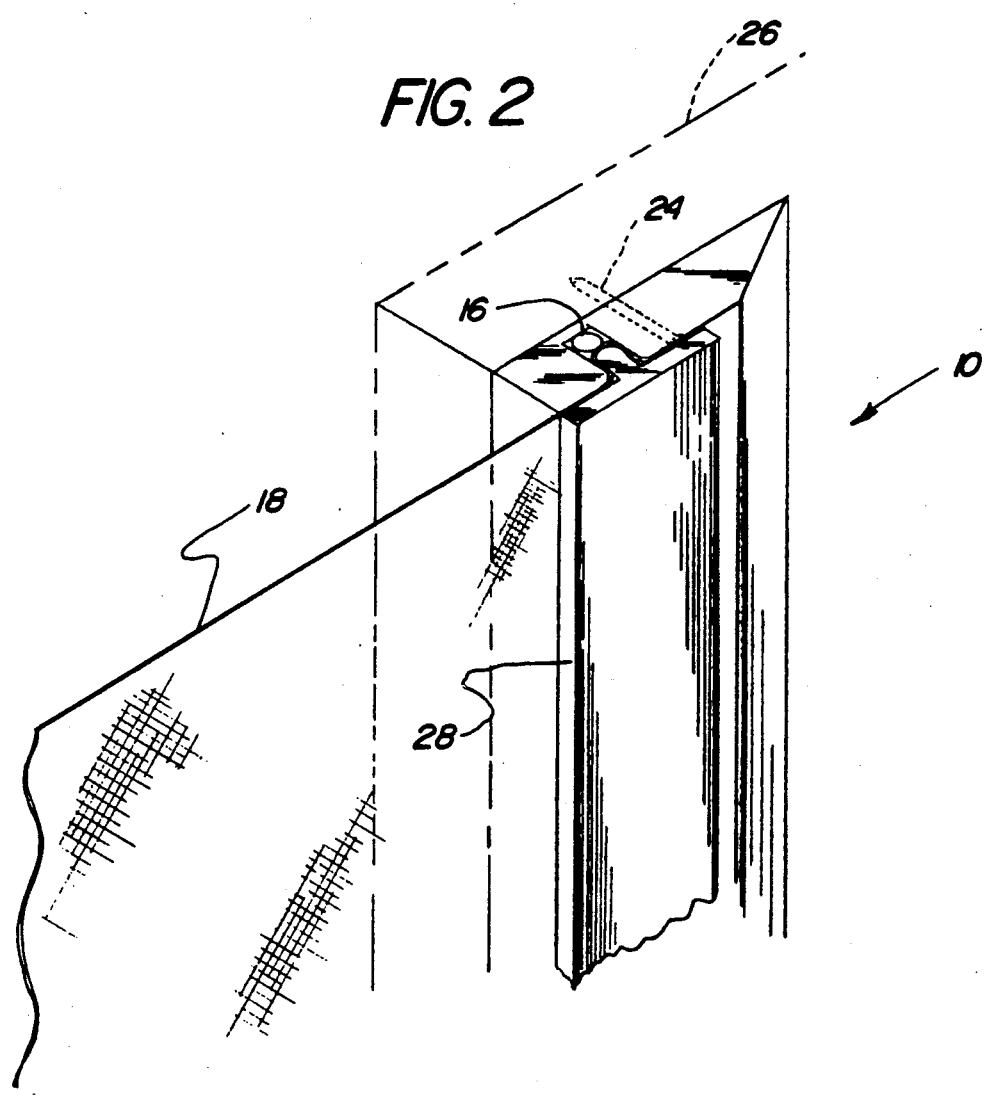
FIG. 2 is a perspective view illustrating the manner of attachment of the molding to an existing window structure.

With reference now to the drawings, and in particular to FIGS. 1 and 2 thereof, a new and improved screen retaining molding embodying the principles and concepts of the present invention and generally designated by the reference numeral 10 will be described.

More specifically, it will be noted that the molding 10 is designed to be attached directly to the outside of a house around existing windows. The molding may be constructed of vinyl, plastic or any other suitable material, and may be cut to any desired length to achieve the desired frame-like configuration around a window. In this connection, a completed frame structure will typically include four strips of molding 10 having forty-five degree angle cuts at free ends thereof so that a picture frame type structure can be achieved for mounting around the window. Each strip of molding 10 will include a bevelled surface 12 so as to prevent water from collecting, and the use of vinyl or plastic will eliminate the need for intermittent painting. When being attached to an existing window frame, the bevelled edge 12 of a strip of molding 10 should be set back from the edge approximately 1/32 of an inch so as to facilitate future painting of the existing window frame.

Figure 4:
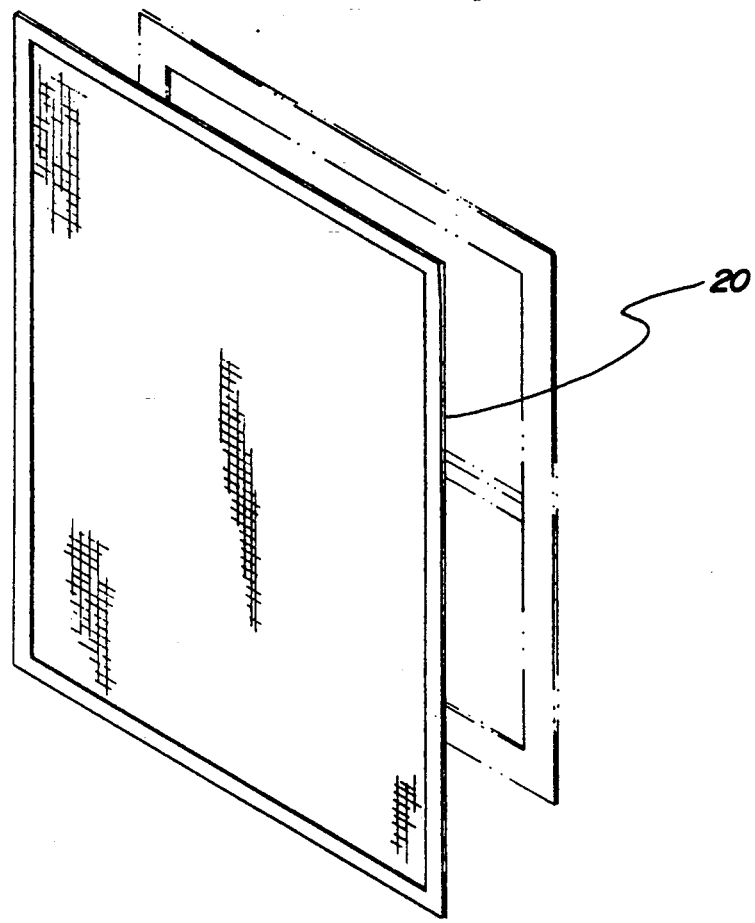
FIG. 4 is a perspective view illustrating a completed screen assembly being attached to a window.
Figure 3:
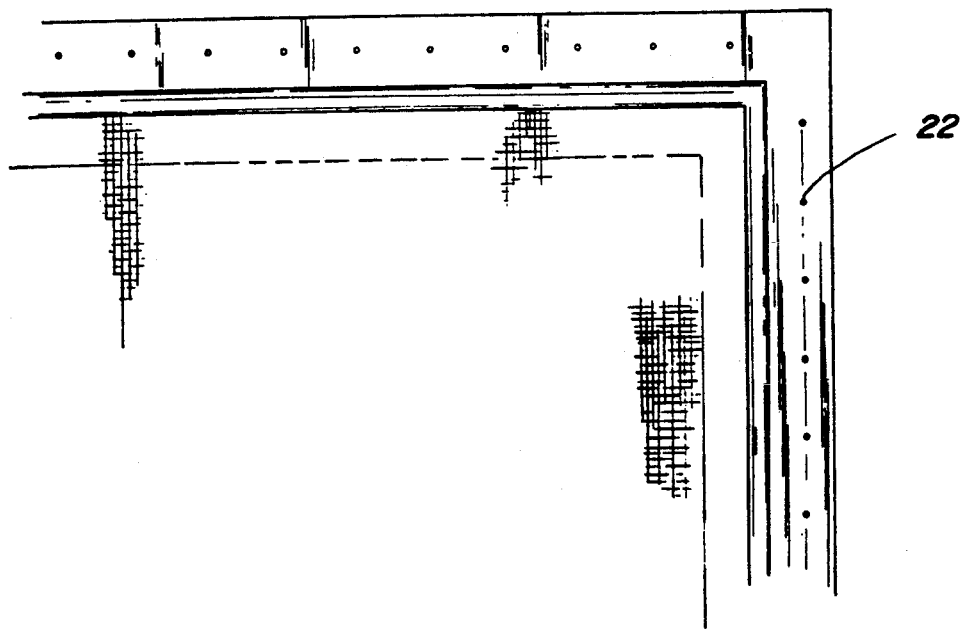
FIG. 3 is a partial front elevation view showing the molding positioned over a window structure.
Figure 5:
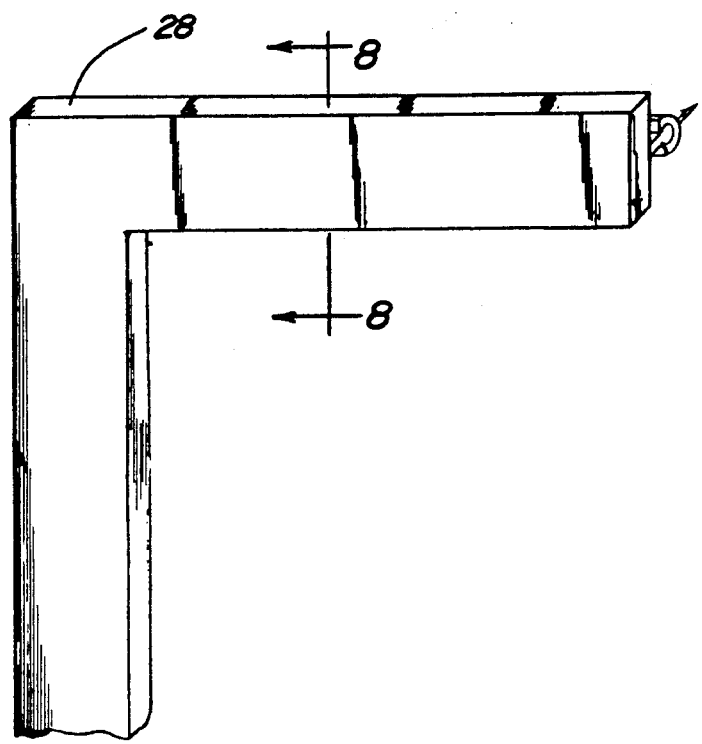
FIG. 5 is a partial perspective view of a decorative cap utilizable in combination with the present invention.
Figure 6:
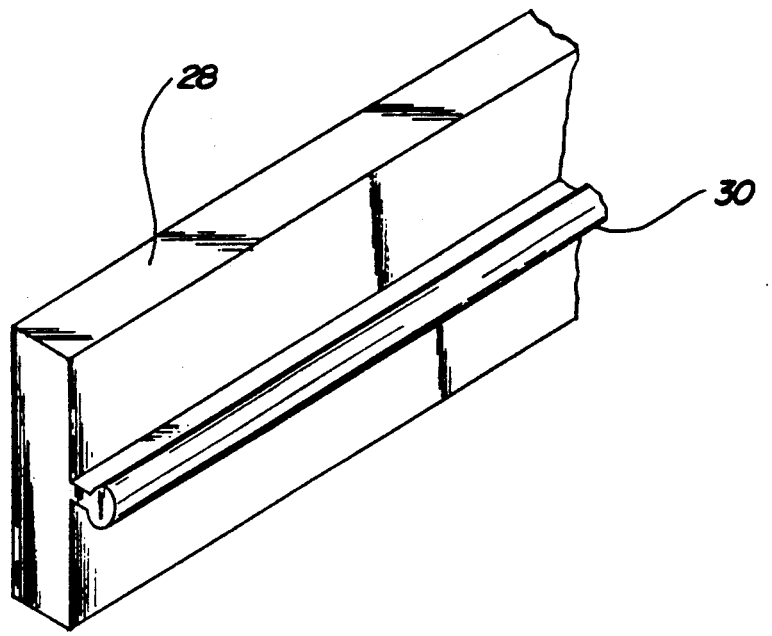
FIG. 6 is a partial rear perspective view of the cap.
Figure 7:
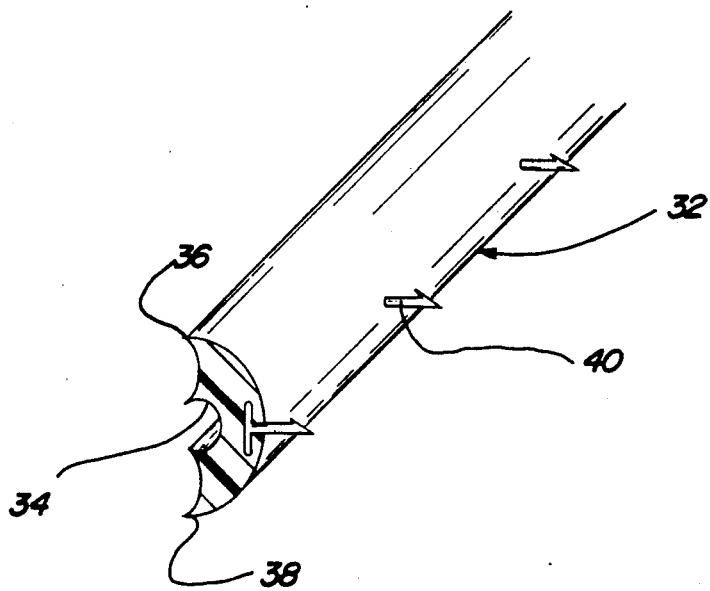
FIG. 7 is a partial perspective view of a flexible retention strip utilizable with the decorative cap.
Figure 9:
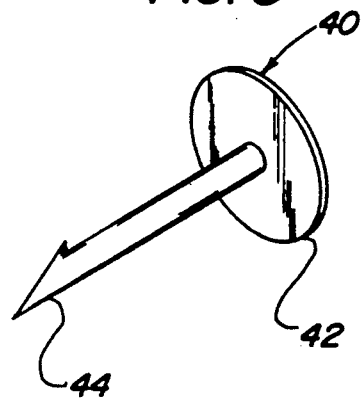
FIG. 9 is a perspective view of a barbed tack forming a part of the present invention.

Referencing FIG. 3 in conjunction with FIGS. 1 and 2, it will be seen that each strip of molding 10 is provided with a longitudinally extending groove 14 which is designed to receive a continuous strip 16 of flexible solid tubular-shaped rubber 16. As best shown in FIG. 2, a rectangularly-shaped section of screen 18 can be cut to the appropriate size so as to overlay a frame structure 20 as shown in FIG. 4, and the flexible rubber member 16 can then be press fitted into the continuous groove 14 to frictionally force the screen into the groove and to effect its permanent retention therein. As the flexible member 16 forces a section of screen 18 into the groove, it can be appreciated that the screen will be stretched across the frame 20 to an appropriate tightness.

While this effectively describes the basic construction of the preferred embodiment of the invention, FIG. 3 illustrates the fact that a plurality of pre-drilled mounting holes 22 can be provided in the frame molding 12, thereby to allow the use of nails 24 or other similar fasteners to effectively attach the molding to an existing window frame 26. As clearly illustrated in FIG. 2, the groove 14 may then be concealed by the attachment of a flexible decorative cap or strip 28 which will be described subsequently in greater detail.

Recognizing that a complete description of one preferred embodiment of the invention has now been described, a more complete description of a decorative cap strip 28 will be provided with reference to FIGS. 5-9. In this connection, each flexible decorative cap strip 28 may include an integral longitudinally extending, centrally disposed bulbous rib 30 which is designed to be forced into the groove 14 thereby to effect an engagement therewith. This engagement results in the attachment of the decorative cap strip 28 over the existing screen retaining molding 10.

Figure 8:
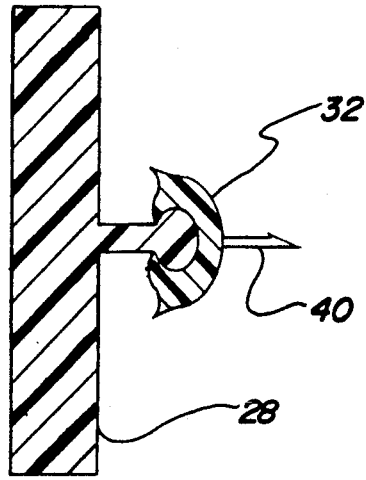
FIG. 8 is a cross-sectional view of the cap as viewed along the lines 8—8 in FIG. 5.

To effect a more secure engagement of the bulbous rib 30 with a groove 14, a flexible rubber retaining strip 32 having a longitudinally extending, centrally disposed circular groove 34 may be snap fitted over the bulbous rib 30 as best illustrated in FIG. 8. The flexible retaining strip 32 includes rearwardly extending edges 36, 38 which, once forced into a groove 14, operate to prevent the decorative cap strip 28 from coming out of the groove. Further, a plurality of barbed tacks 40 having flat metal tops 42 and orthogonally directed points 44 may be integrally molded within the flexible strip 32 whereby a plurality of these barbed points come into engagement with a tubular retaining member 16 when the decorative cap 28 is attached to the molding 10. As such, when the decorative cap strip 28 is removed from the molding 10, the barbed points 44 operate to pull the flexible member 16 out of the groove 14, thereby to facilitate a removal of the screen 18 in a now apparent manner.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved screen retaining assembly comprising:
   molding means attachable to an existing porch frame, window frame, or the like;
   groove means formed in said molding means;
   first flexible strip means frictionally engageable with said groove means, thereby to hold an edge of flexible screen within said groove means wherein said screen edge is positioned between said groove means and said first flexible strip means;

decorative cap strip means attachable to said molding means so as to conceal said groove means having said first flexible strip means retained therein, said decorative cap strip means being frictionally engageable with said groove means, said decorative cap strip means further including a longitudinally extending, centrally disposed bulbous member which is frictionally engageable with said groove means;

second flexible strip means removably attachable to said longitudinally extending bulbous member, said second flexible strip means being frictionally engageable with said groove means to retain said decorative cap strip means in position over said molding means, said second flexible strip means further including rearwardly extending edges which operate to prevent said second flexible strip means from becoming disengaged with said groove means; and tack means attached to said second flexible strip means, said tack means being engageable with said first flexible strip means when said second flexible strip means is positioned within said groove means, said tack means further including a use of barbed points which engage said first flexible strip means, thereby to effect a removal of said first flexible strip means from said groove means upon a removal of said second flexible strip means from said groove means.

* * * * *